United States Patent [19]
Peberdy

[11] 3,897,878
[45] Aug. 5, 1975

[54] NUCLEAR REACTOR REFUELLING MACHINE

[75] Inventor: John Malcolm Peberdy, Huncote, England

[73] Assignee: United Kingdom Atomic Energy Authority, London, England

[22] Filed: Sept. 24, 1973

[21] Appl. No.: 400,061

[30] Foreign Application Priority Data
Oct. 2, 1972 United Kingdom............. 45433/72

[52] U.S. Cl................. 214/18 N; 176/30; 214/28; 294/86 A; 294/86.28
[51] Int. Cl............................................ G21c 19/10
[58] Field of Search ............. 214/18, 18 N, 27, 28; 176/30–32; 294/86 A, 86.26, 86.28, 294/86.29, 86.3

[56] References Cited
UNITED STATES PATENTS
2,794,670 6/1957 Menegus et al............. 294/86.29 X
3,136,432 6/1964 Nicoll et al. ................. 214/18 N X Primary Examiner—Robert G. Sheridan
Attorney, Agent, or Firm—Larson, Taylor & Hinds

[57] ABSTRACT

A guide tube for a fuel element assembly gripper unit is radially displaceable on a parallel linkage from the lower end of a vertically disposed rotatable support structure. The gripper unit is longitudinally slidable within the guide tube to enable a fuel element assembly to be fully withdrawn into the guide tube. The gripper unit has a rotatable gripper head for rotating the fuel element assembly about its longitudinal axis.

3 Claims, 9 Drawing Figures

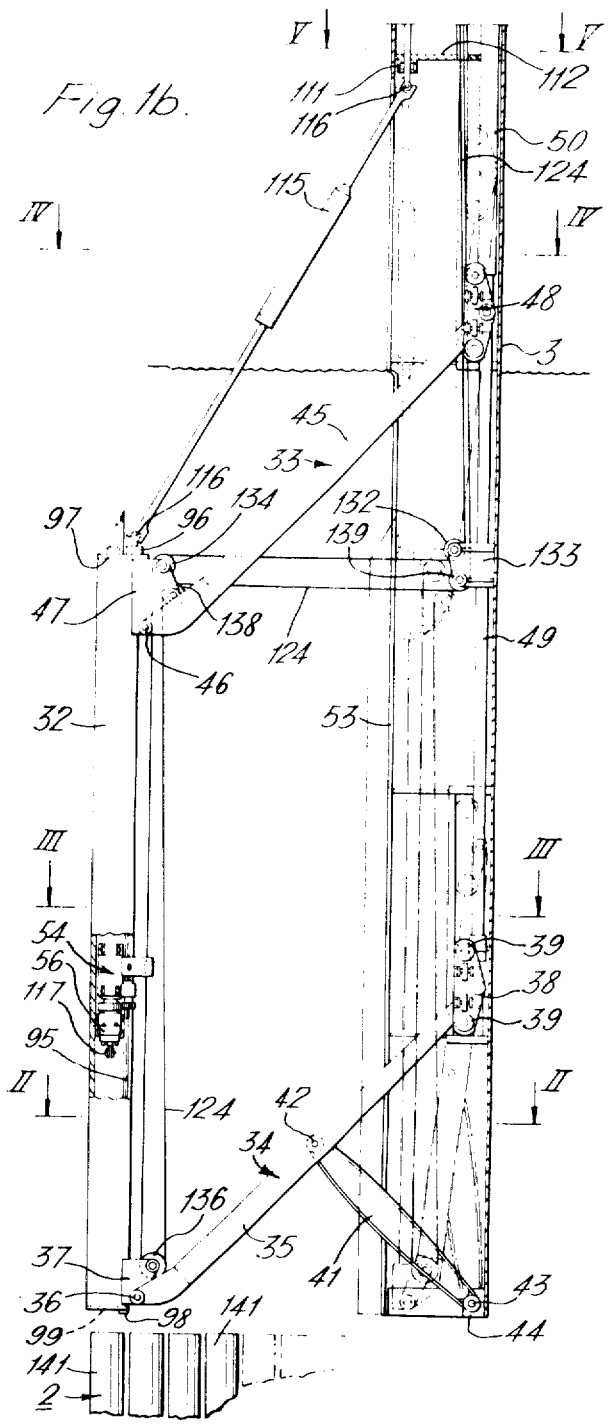

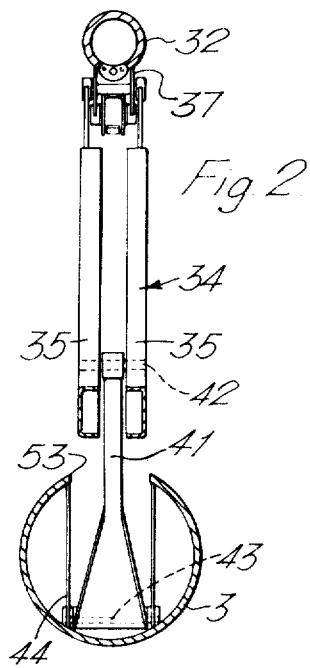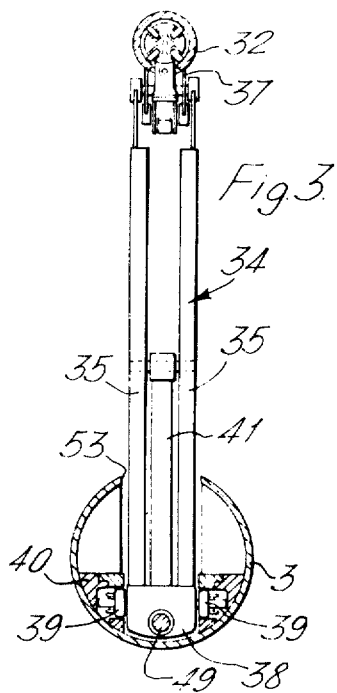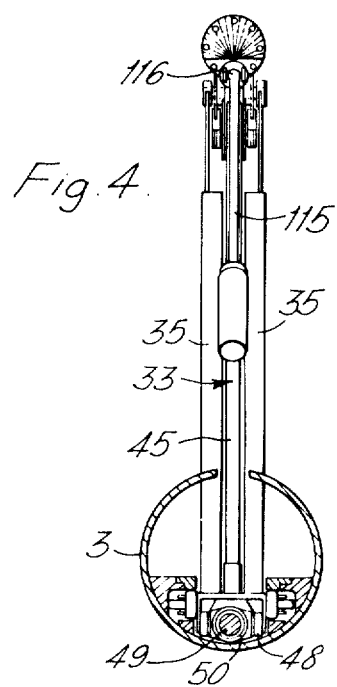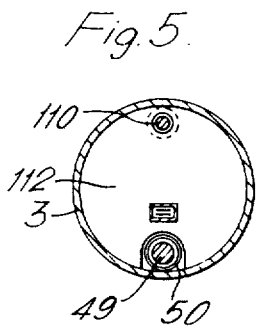

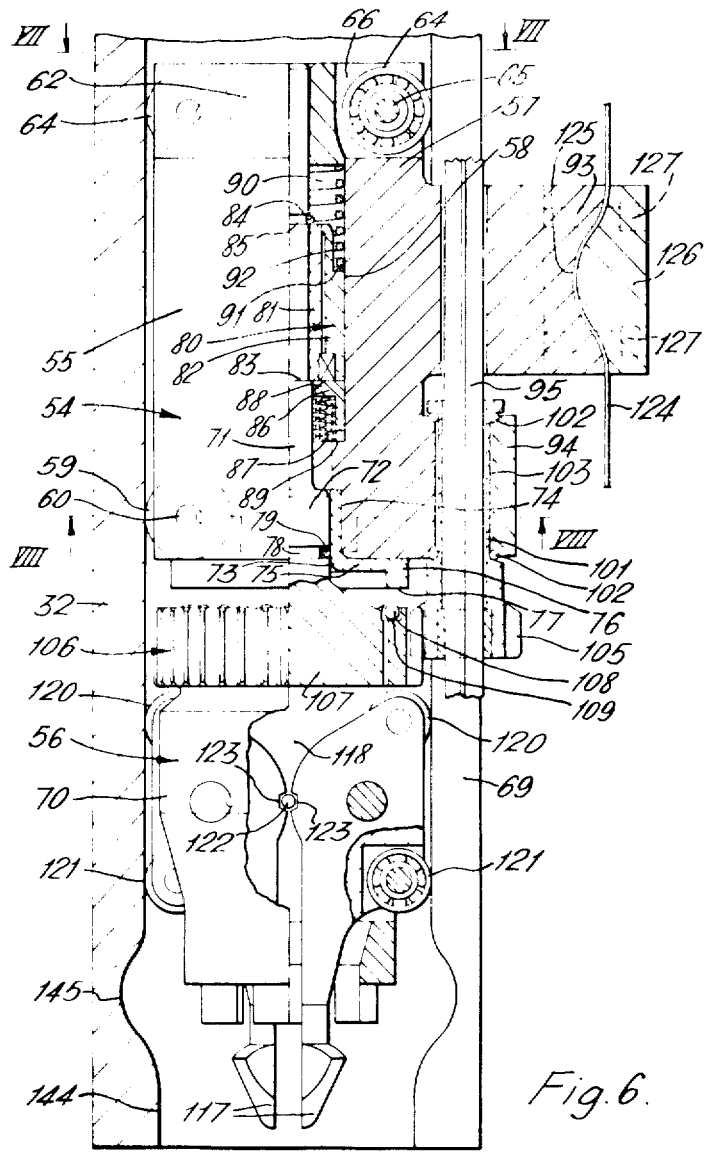
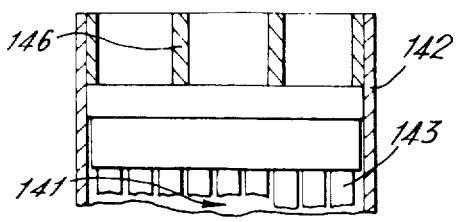
Fig.6.

NUCLEAR REACTOR REFUELLING MACHINE

BACKGROUND OF THE INVENTION

This invention relates to a nuclear reactor refuelling machine by which is meant a mechanism primarily for loading fuel assemblies into a reactor core structure and for removing fuel element assemblies from the reactor core structure. The machine may also be used for handling other reactor members for example control rod assemblies.

The invention is particularly concerned with the kind of reactor refuelling machine such as is disclosed in British Pat. No. 1112384 which comprises a gripper unit having linear travel along a hollow guide means sufficient for a fuel assembly to be raised from the reactor core structure by the gripper unit fully into the interior of the hollow guide means. The hollow guide means may be in the form of a tubular member which is mounted so as to be radially extendible from the lower end of a vertically arranged rotable support structure. The tubular member constituting the hollow guide means may be mounted on the support structure by a parallel linkage so as to be movable radially outwards in parallel fashion from the support structure. By rotation of the support structure and by radial extension of the guide means from the support structure the lower end of the guide means may be brought into alignment with any one of a group of fuel assemblies in the core structure so that the fuel assembly can be engaged by the gripper unit and raised from the core structure into the guide means for transfer to a fuel storage facility adjacent the reactor core structure. A refuelling machine of this form is hereinafter referred to as a refuelling machine of the pantograph type.

In nuclear reactors having a high neutron flux, for example fast reactors, and in which the core structure comprises an array of closely packed parallel fuel assemblies a problem can arise due to the fact that the neutron flux is not uniform across the reactor core structure.

The neutron flux varies transversely across the reactor structure being highest at the centre of the core structure and falling to a lower value at the outer edges of the core structure. Certain materials, such as stainless steel are subject to growth under neutron irradiation. Therefore where, for instance, the outer casings of fuel element assemblies in a nuclear reactor are made of such materials, the casings will be subject to growth in use in the reactor. Due to the variation in the level of the neutron flux across the reactor core structure, the side of a fuel assembly towards the outside of the reactor core structure will be subjected to a lower neutron flux and therefore will grow less than the side of the fuel assembly towards the inside of the reactor core structure. This differential growth can result in bowing of the fuel assembly. If the fuel assembly is part of a closely packed array in the core structure of the reactor the resultant bowing can result in jamming of the fuel assemblies in the reactor core structure.

It has been proposed to avoid this difficulty by rotation of the fuel assemblies through 180° part way through their life in the reactor core structure. In this way the growth due to neutron irradiation is equalised and bowing of the fuel assemblies is minimised. Control rod assemblies may also be rotated with advantage in a similar manner.

The present invention provides a nuclear reactor refuelling machine of the kind hereinbefore described having the facility for rotation of a fuel assembly or control rod assembly, through 180° whilst the assembly is supported in the guide tube of the refuelling machine by the gripper unit.

SUMMARY OF THE INVENTION

Accordingly in a nuclear reactor refuelling machine of the kind described the gripper unit has a rotatable head and means is provided for rotating the head of the gripper unit inside the guide tube to effect rotation of a fuel assembly or control rod assembly carried by the rotatable head of the gripper unit.

DESCRIPTION OF THE DRAWINGS

One embodiment of the invention will now be described by way of example with reference to the accompanying drawings in which:

FIGS. 1a and 1b constitute a longitudinal sectional elevation of one form of nuclear reactor refuelling machine in accordance with the invention, FIG. 2 is a cross-section along the line II — II in FIG. 1, FIG. 3 is a cross-section along the line III in FIG. 1, FIG. 4 is a cross-section along the line IV — IV in FIG. 1, FIG. 5 is a cross-section along the line V — V in FIG. 1, FIG. 6 is a part sectional longitudinal elevation of a gripper unit in accordance with the invention.

DESCRIPTION OF THE PREFERRED EMBODIMENT

Figure 1A:
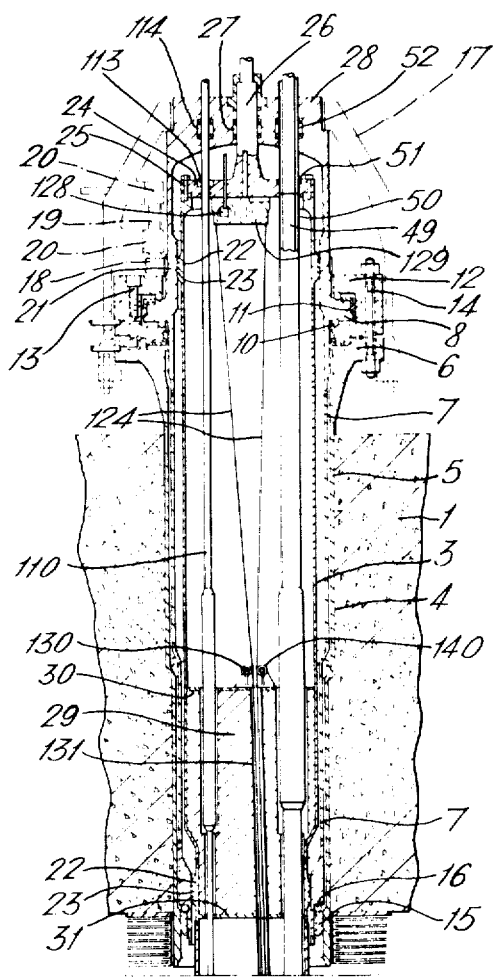

FIGS. 1a and 1b of the drawings show a nuclear reactor refuelling machine of the pantograph type such as is disclosed in British Pat. No. 1112383.

The refuelling machine is supported from an upper rotating shield 1 above the core structure 2 of the reactor.

The refuelling machine comprises a main support tube 3 which is housed at its upper end in a vertical aperture 4 in the rotating shield 1, the lower part of the main support tube 3 extending below the rotating shield 1.

The aperture 4 is offset with respect to the vertical axis of rotation of the rotating shield 1 so that by rotation of the shield 1 the refuelling machine can be positioned for servicing any required group of fuel element assemblies in the reactor core structure 2.

Referring to FIG. 1a the vertical aperture in the rotating shield 1 is fitted with a liner tube 5 which has an external upper end flange 6. A rotatable tubular housing 7 for the upper end of the main support tube 3 is fitted coaxially inside the liner tube 5 and has an external bearing flange 8 at its upper end. A bearing ring 9 is mounted on the upper end flange 6 of the liner tube 5. The rotatable tubular housing 7 is mounted at its bearing flange 8 on the bearing ring 9 by ball bearings 10. The bearing flange 8 of the tubular housing 7 fits in an annular recess 11 around the inner edge of the bearing ring 9 and an annular retaining ring 12 is attached to the upper face of the bearing ring 9 by bolts 13. Clamping bolts 14 extend through the retaining ring 12, the bearing ring 9 and the end flange 6 of the liner tube 5. A further bearing ring 15 is fitted in the lower end of the liner tube 5. The lower end of the rotatable tubular housing 7 is supported from the bearing ring 15 by ball bearings 16. The upper end of the rotatable tubular housing 7 above the rotating shield 1 is enclosed by a bell housing 17. A pinion gear 18 is mounted on a shaft 19 which is supported by bearings fitted in flanges 20 inside the bell housing 17. The pinion 18 is engaged with a ring gear 21 formed around the upper end of the rotatable tubular housing 7. The upper end of the main support tube 3 is a sliding fit inside the rotatable tubular housing 7. Upper and lower circumferential bearing surfaces 22 on the upper end of the main support tube 3 within the tubular housing 7 are a sliding fit in the bore of the tubular housing 7. Piston rings 23 fitted around the bearing surfaces 22 seal with the bore of the tubular housing 7. An end plate 24 is attached to the upper end of the main support tube 3 by bolts 25. A shaft 26 extending upwardly from the centre of the end plate 25 passes through a seal 27 in the closed upper end 28 of the tubular housing 7. Within the region of the rotating shield 1 the main support tube 3 contains neutron shielding material 29 which fills the interspace between upper and lower transverse plates 30 and 31 in the main support tube 3.

A gripper guide tube 32 is mounted so as to be radially extendible from the lower end of the main support tube 3. The gripper guide tube 32 is supported from the lower end of the main support tube 3 by upper and lower parallel linkages 33 and 34. The lower linkage 34 comprises two parallel arms 35 pivoted by pins 36 at their outer ends to a bifurcated bracket 37 at the lower end of the gripper guide tube 32. The arms 35 are pivoted at their other ends on a carriage 38 which is mounted so as to be movable longitudinally within the lower end of the main support tube 3. The carriage 38 is fitted with rollers 39 which run on tracks 40 inside the lower end of the main support tube 3 (see FIG. 3). An extender strut 41 is pivoted by a pin 42 at one end midway between the ends of the arms 35 of the lower linkage 34 and is pivoted by a pin 43 at its other end on a bracket 44 fitted at the extreme lower end of the main support tube 3. The upper parallel linkage 33 comprises a single arm which is pivoted by pins 46 at its outer end to a bifurcated bracket 47 at the upper end of the gripper guide tube 32. The arm 45 is pivoted at its other end on a carriage 48, which is mounted similarly to the carriage 30 at a higher level in the main support tube 3.

Coaxial drive shafts 49 and 50 extend longitudinally through the main support tube 3. The inner drive shaft 49 is connected at its lower end to the lower carriage 38 whilst the outer drive shaft 50 is connected at its lower end to the upper carriage 48. The drive shafts 49 and 50 extend together through the shielding material 29 in the main support tube 3, through a seal 51 in the end plate 25 of the main support tube 3 and then through a seal 52 in the closed upper end 28 of the tubular housing 7. The lower end of the main support tube 3 has a longitudinal slot 53 for passage of the linkages 33 and 34 and also allowing nesting of the gripper guide tube 32 in the lower end of the main support tube 3 when the gripper guide tube 32 is in the closed position.

Figure 7:
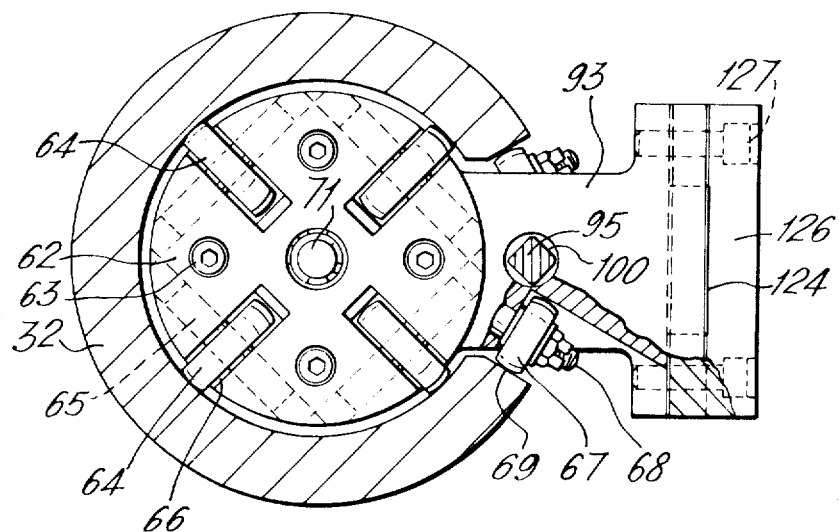
FIG. 7 is a cross-section along the line VII — VII in FIG. 6.
Figure 8:
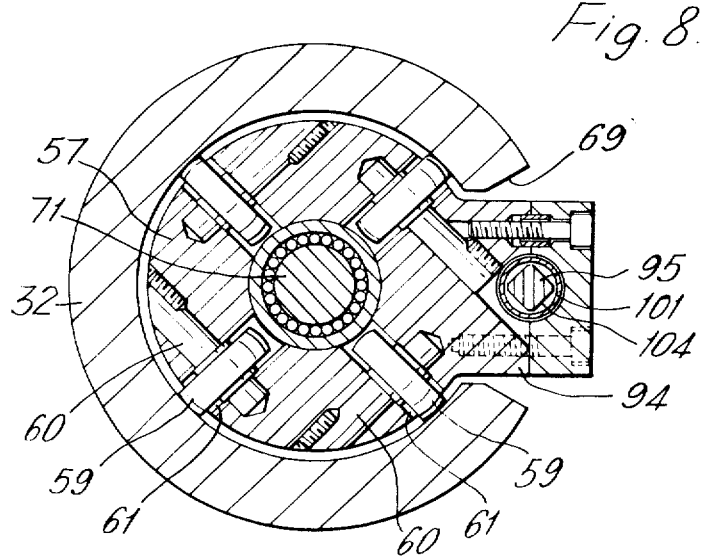
FIG. 8 is a cross-section along the line VIII — VIII in FIG. 6.

As shown in FIG. 6 the gripper guide tube 32 contains a gripper assembly 54 comprising a gripper carriage 55 and a rotating head 56. The gripper carriage 55 comprises a cylindrical body part 57 having a longitudinal bore 58 of circular cross section. As shown in FIGS. 6 and 8 four lower guide rollers 59 are mounted on shafts 60 in radial Slots 61 at the lower end of the body part 57. An annular member 62 is attached to the upper end of the body part 57 by socket headed screws 63 (See FIG. 7). Four upper guide rollers 64 are mounted on shafts 65 in radial slots 66 in the annular member 62. The lower guide rollers 59 project radially beyond the periphery of the body part 57 and the upper guide rollers 64 project radially beyond the periphery of the annular member 62. The guide rollers 59 and 64 run on the inside surface of the gripper guide tube 32. As shown in FIG. 7 the body part 57 of the gripper carriage 55 is fitted with two azimuthal guide rollers 67. The rollers 67 are rotatable on shafts 68 extending radially from the body part 57. The azimuthal guide rollers 67 run on the edges of a longitudinal slot 69 extending the full length of the gripper guide tube 32. The rotating head 56 of the gripper assembly 54 comprises a body part 70 basically of circular cross Section. A shaft 71 integral with the body part 70 of the rotating head 56 extends through the bore 58 in the body part 57 of the gripper carriage 55. The upper end of the shaft 71 fits with close clearance in the bore of the annular member 62 at the upper end of the body part 57 of the gripper carriage 55. At its lower junction with the body part 70 of the rotating head 56 the shaft 71 has a portion 72 of large diameter. The portion 72 of the shaft 71 bears in a Sleeve 73 which is fitted in a counterbore 74 at the lower end of the bore 58 in the body part 57 of the gripper carriage 55. The sleeve 73 has an end flange 75 with a rim 76 having an annular end face 77. A circumferential groove 78 around the part 72 of the shaft 71 contains a ring of ball bearings 79 which run on the inside surface of the Sleeve 73. A composite Sleeve assembly 80, comprising an inner Sleeve 81 and an outer Sleeve 82 is fitted on the shaft 71 with the inner Sleeve 81 located longitudinally between a step 83 on the shaft 71 and a circlip 84 fitted in a circumferential groove 85 around the shaft 71. The outer Sleeve 82 of the sleeve assembly 80 is a close fit in the bore 58 of the carriage body part 57 and bears against a face seal 86 fitting in the bore 58 below the sleeve assembly 80. A stack of dished washers 87 are located between an internal flange 88 in the face seal 86 and an internal step 89 in the bore 58 of the carriage body part 57. A coil spring 90 fitting in the bore 58 above the Sleeve assembly 80 is held in compression between the annular member 62 on the upper end of the carriage body part 57 and the face of a step 91 at the base of a rebate 92 around the upper end of the outer Sleeve 82 of the Sleeve assembly 80.

The body part 57 of the gripper carriage 55 has upper and lower side lugs 93 and 94. As shown in FIGS. 1 and 6 a shaft 95 of square cross-section is mounted extending longitudinally along the full length gripper guide tube 32. At its upper end the shaft 95 is mounted in a bearing 96 carried by an upper end plate 97 attached to the top of the gripper guide tube 32. At its lower end the shaft 95 is mounted in a bearing 98 carried by a lower end plate 99 attached to the bottom of the gripper guide tube 32. As shown in FIGS. 6 and 7 the shaft 95 passes through a drilling 100 in the upper side lug 93 of the carriage body part 57. As shown in FIGS. 6 and 8, the shaft 95 also passes through a Sleeve 101 which is rotatably mounted by ball bearings 102 in a drilling 103 in the lower side lug 94 of the carriage body part 57. As shown in FIG. 8 the sleeve 101 has a square cross-section bore 104 complementary to the cross-section of the shaft 95, so that the sleeve is slidable longitudinally on the shaft 95 but is rotatable therewith. A spur gear 105 is formed at the lower end of the sleeve 101 and engages with a ring gear 106 formed by machining of gear teeth in a flange 107 around the upper end of the body part 70 of the rotating head 56. An annular race of balls 109 is interposed between the body member 54 and the gripper head 56 to provide a thrust bearing. The race of balls is contained in an annular groove 108 which can be brought to bear on the end face 77 of the sleeve 73 by upward axial movement of the shaft 71. The thrust race is brought into operation when a downward thrust of the gripper unit is required to effect engagement of the gripper head with a fuel element assembly.

Referring again to FIG. 1 a shaft 110 extends longitudinally through the upper part of the main support tube 3. The shaft 110 is supported at its lower end by a bearing 111 carried by a transverse plate 112 in the main support tube 3. The shaft 110 extends through the shielding material 29 in the main support tube 3 and is supported at its upper end by a bearing 113 carried by the end plate 25 at the upper end of the main support tube 3. The upper end of the shaft 110 extends through a seal 114 in the closed upper end 28 of the rotatable tubular housing 7. The lower end of the shaft 110 is connected with the upper end of the shaft 95 by a telescopic drive shaft 115. The ends of the drive shaft 115 are connected with the ends of the shafts 95 and 110 by universal couplings 116.

Referring again to FIG. 6 the body part 70 of the rotating head 56 in the gripper assembly 54 is fitted with two lifting jaws 117. The jaws 117 are fitted in radial slots 118 in the body part 70 of the rotating head 56. The jaws 117 are mounted on shafts 119 in the slots 118 of the body part 70. Each jaw 117 is fitted with an upper roller 120 and a lower roller 121 which run on the inside surface of the gripper guide tube 32. The jaws 117 are interlocked to rotate together by rollers 122 fitting in slots 123 in the adjacent inner edges of the jaws 117.

The upper side lug 93 of the carriage body part 57 provides for attachment of a drive tape 124 to the carriage body part 57. As shown in FIG. 6 the outer face 125 of the upper side lug 93 on the carriage body part 57 has a concave profile. The drive tape 124 is clamped between the outer face 125 of the side lug 93 and a block 126 having a complementary profile and which is attached to the side lug 93 by socket headed screws 127.

A drive mechanism for the drive tape 124 comprises two mutually driven pretensioned drums 128 and 129 (FIG. 1a) which are mounted in the upper end of the main support tube 3 underneath the end plate 25. The two ends of the drive tape 124 are wound on the drums 128 and 129. From the drum 128 the drive tape 124 passes over a guide pulley 130 mounted on the upper transverse plate 30 above the neutron shielding material 29 in the main support tube 3. The drive tape 124 then passes through a longitudinal passageway 131 in the shielding material 29 and then over a pulley 132 carried by a bracket 133 mounted in the lower part of the main support tube 3. From the pulley 132 the drive tape 124 passes over an upper pulley 134 carried by the bracket 47 at the upper end of the gripper guide tube 32. From the pulley 134 the drive tape 124 runs along the length of the gripper guide tube 32 and then passes over a lower pulley 136 carried by the bracket 37 mounted at the lower end of the gripper guide tube 32. The gripper assembly 54 is clamped to the length of the drive tape 124 between the upper and lower pulleys 134 and 136. From the lower pulley 136 the drive tape 124 passes over a second pulley 138 carried by the bracket 47 at the upper end of the gripper guide tube 32. From the pulley 138 the drive tape 124 passes over a second pulley 139 carried by the bracket 133 in the lower part of the main support tube 3. From the pulley 139 the drive tape 124 passes through the longitudinal passageway 131 in the neutron shielding material 29 and then over a guide pulley 140 mounted, similarly to the guide pulley 130 on the upper transverse plate 30 above the neutron shielding material 29 in the main support tube 3. The drive tape 124 then passes to the drum 129.

In a nuclear reactor for which the above described refuelling machine is designed the core structure is for example composed of fuel assemblies 141 (FIG. 1) packed vertically directly against another. As shown in FIG. 6 each fuel assembly 141 may comprise a casing 142 of generally hexagonal cross-section containing an assembly of parallel fuel pins 143 section and the fuel assemblies 141 are packed together closely in generally triangulated array. In such a core structure the neutron flux will vary transversely across the reactor core structure, the neutron flux being higher at the centre of the core structure than that at the edges of the core structure. Therefor each fuel element assembly 141 will be subjected to a higher neutron flux on its side towards the inside of the core structure than on its side towards the outside of the core structure. Where the fuel assemblies 141 have casings 142 of a material which is subject to growth under neutron irradiation, for example stainless steel, the sides of the casings 142 which are subjected to the higher neutron flux will have a greater growth due to neutron irradiation. This can result in bowing of the fuel assemblies 141 giving rise to difficulties in removal of the fuel element assemblies 141 from the reactor core structure.

The refuelling machine of the present invention enables removal of the fuel assemblies 141 from the reactor core structure at the end of their useful life and transfer of the fuel element assemblies to a storage facility adjacent the reactor core structure. The refuelling machine also provides for charging of replacement fuel assemblies 141 into the reactor core structure. However the particular feature of the refuelling machine which is the subject of the present invention is the facility for removal of a fuel element assembly from the core structure into the gripper guide tube 32 of the refuelling machine, for rotation of the fuel element assembly 144 through 180° in the gripper guide tube 32 and for then returning the rotated fuel element assembly 141 to the vacated position in the reactor core structure. This operation is carried out part way through the life of the fuel element assembly 141 in the reactor core structure.

Relocation of the fuel assembly 141 in the core structure turned through 180° from its original position evens out the growth of the casing 142 under neutron irradiation. The inner face of the casing 142 which is subjected to the greater neutron flux initially becomes the outer face after rotation of the fuel assembly and is subjected to lesser neutron flux during the remaining life of the fuel assembly 141. Thus bowing of the fuel element assembly 141 due to differential growth under neutron irradiation is reduced.

Operation of the refuelling machine is as follows. The lower end of the gripper guide tube 32 is brought into axial alignment with the required fuel assembly 141 by rotation of the main support tube 3 and by extension of the gripper guide tube 32 radially from the main support tube 3. Rotation of the main support tube 3 is by rotation of the housing 7 by means of the pinion gear 18 driving the housing 7 through the ring gear 22 on the housing 7.

Radial extension of the gripper guide tube 32 from the main support tube 3 is obtained through the parallel linkages 33 and 34. The carriages 38 and 48 on which the inner ends of the linkages 33 and 34 are pivoted are driven longitudinally in the main support tube 3 by rotation of the coaxial drive shafts 49 and 50. During rotation of the main support tube 3 and radial extension of the gripper guide tube 32 the main support tube 3 is held in a raised position in the housing 7 so that the lower end of the gripper guide tube 32 has a clearance above the upper ends of the fuel assemblies 141. The main support tube 3 is moved to the raised position in the housing 7 by the Shaft 26 which extends from the end plate 25 at the upper end of the main support tube 3.

The gripper assembly 54 is driven by means of the drive tape 124 to lower end of the gripper guide tube 32 so that the jaws 117 of the gripper assembly 54 extend below the lower end of the gripper guide tube 32. As shown in FIG. 6 the lower end of the bore of the gripper guide tube 32 is machined to form a cam profile. The cam profile includes a lower swell 144 and an upper recess 145. When the gripper assembly 54 is located at the lower end of the gripper guide tube 32 the lower rollers 121 on the jaws 117 ride on the swell 144 of the cam profile whilst the upper recess 145 of the cam profile accommodates the upper rollers 120 of the jaws 117. Thus the jaws 117 of the gripper assembly are held in a retracted position to enter into a lifting ring 146 at the upper end of the corresponding fuel assembly 141. The main support tube 3 is now lowered by means of the Shaft 26 to take up the clearance between the lower end of the gripper guide tube 32 and the upper end of the fuel assembly 141. Thus the jaws 117 of the gripper assembly 54 enter into the lifting ring 146 at the upper end of the fuel assembly 141 at which point the gripper assembly 54 is retracted into the end of the gripper guide tube 32 as lowering of the main support tube 3 and hence of the gripper guide tube 32 continues. Retraction of the gripper assembly 54 into the lower end of the gripper guide tube 32 is by means of the drive tape 124, which is driven by the drums 128 and 129. As the gripper assembly 54 is retracted into the lower end of the gripper guide tube 32 the upper rollers 120 of the jaws 117 move out of the upper rebate 145 in the cam profile at the lower end of the gripper guide tube 32 and engage the main bore of the gripper guide tube 32. This causes the jaws 117 to be rotated into engagement with the lifting ring 146 of the fuel assembly 141. The fuel assembly 141 can now be raised from the reactor core structure into the gripper guide tube 32 by raising the gripper assembly 54 into the gripper guide tube 32. When the fuel assembly 141 is fully housed in the gripper guide tube 32 the main support tube 3 can be raised to clear the lower end of the gripper guide tube 32 above the reactor core structure. By rotation of the main support tube 3 the gripper guide tube 32 can be moved into a position over a fuel element storage facility adjacent the reactor core structure. The gripper guide tube 32 is moved radially to a particular location over the fuel element storage facility when the fuel element assembly 141 is lowered into and released in the fuel element storage facility.

Alternatively and in accordance with the present invention the fuel element assembly 141 can be rotated through 180° whilst housed in the gripper guide tube 32 and then can be returned to the vacated location for further irradiation in the reactor core structure. Rotation of the fuel element assembly 141 in the gripper guide tube 32 is effected by rotation of the shaft 95 on the gripper guide tube 32 by means of the Shaft 110 in the main support tube 3 acting through the telescopic drive shaft 115. Rotation of the shaft 95 rotates the Sleeve 101 and the spur gear 105 on the Sleeve 101 drives the rotating head 56 of the gripper assembly 54 through the ring gear 106 on the body part 70 of the rotating head 56.

I claim:

1. In a nuclear reactor refuelling machine for the charging and discharging of fuel assemblies into and out from the core structure of a nuclear reactor, a main support tube for passing through a cover of a nuclear reactor core containing vessel in rotatable manner; a gripper guide tube disposed with longitudinal axis parallel to the longitudinal axis of the support tube, the gripper guide tube having a longitudinal slot; a pair of parallel linkages extending between the main support tube and the gripper guide tube, the gripper guide tube being movable on the linkages radially inwardly and outwardly relative to the main support tube; a fuel element gripper assembly in said gripper guide tube and having a gripper carriage and a gripper head, the gripper head being rotatable relative to the gripper carriage about the longitudinal axis common to the guide tube and gripper assembly, the gripper carriage having a projection extending radially through said slot for connection with drive means for displacing the gripper carriage along the longitudinal axis of the gripper guide tube; and means extending along the main support tube for actuating the parallel linkages, for displacing the gripper assembly within the gripper guide tube and for rotating the gripper head relative to the gripper carriage.

2. A nuclear reactor refuelling machine according to claim 1 wherein the gripper carriage is constrained to linear travel along the gripper guide tube by guide rollers disposed to roll along the edge surfaces of the longitudinal slot in the gripper guide tube.

3. A nuclear reactor refuelling machine according to claim 2 wherein the drive means for displacing the gripper assembly along the londitudinal axis of the gripper guide tube comprises a tape attached to the projection of the gripper carriage at a position intermediate the length of the tape, the ends of the tape extending over pulleys to winding drums housed within the main support tube.

* * * * *